United States Patent
Shu et al.

(10) Patent No.: US 9,069,131 B2
(45) Date of Patent: Jun. 30, 2015

(54) TRANSFER PRINT STRUCTURE AND THE MANUFACTURING METHOD THEREOF

(75) Inventors: Fang-An Shu, Hsinchu (TW);
Ted-Hong Shinn, Hsinchu (TW);
Yao-Chou Tsai, Hsinchu (TW);
Wen-Chung Tang, Hsinchu (TW)

(73) Assignee: E INK HOLDINGS INC., Hsinchu (TW)

( * ) Notice: Subject to any disclaimer, the term of this patent is extended or adjusted under 35 U.S.C. 154(b) by 1083 days.

(21) Appl. No.: 13/107,570

(22) Filed: May 13, 2011

(65) Prior Publication Data

US 2011/0315032 A1 Dec. 29, 2011

(30) Foreign Application Priority Data

Jun. 25, 2010 (TW) ................................ 99120876 A (51) Int. Cl.
| | | |
|---|---|---|
| G02B 26/00 | (2006.01) | |
| G09G 3/34 | (2006.01) | |
| B44C 1/17 | (2006.01) | |
| G02B 5/20 | (2006.01) | |
| G02B 26/02 | (2006.01) | |
| B41M 3/00 | (2006.01) | |
| B41M 3/12 | (2006.01) | |
| B32B 7/06 | (2006.01) | |
| B44C 1/16 | (2006.01) | |
| B41M 5/124 | (2006.01) | |
| B41M 5/382 | (2006.01) | |
| B41M 5/50 | (2006.01) | |
| G02F 1/167 | (2006.01) | |

(52) U.S. Cl.
CPC ............. *G02B 5/201* (2013.01); *G02B 26/00* (2013.01); *G02B 26/026* (2013.01); *B41M 3/00* (2013.01); *B41M 3/12* (2013.01); *B32B 7/06* (2013.01); *B44C 1/16* (2013.01); *B44C 1/17* (2013.01); *B41M 5/124* (2013.01); *B41M 5/38271* (2013.01); *B41M 5/502* (2013.01); *G02F 1/167* (2013.01)

(58) Field of Classification Search
CPC ...... G02B 26/00; G02B 26/026; G02F 1/167; B41C 1/1008; B41C 1/1075; G09G 3/34; G09G 3/344; G09G 3/3453; G09G 17/06; B44C 1/16; B44C 1/17; B32B 7/00; B32B 7/06; B32B 2307/402; B32B 2037/243; B41M 1/00; B41M 1/14; B41M 1/26; B41M 3/00; B41M 3/12; B41M 5/124; B41M 5/382; B41J 2/325; B41J 17/00; Y10S 428/913
USPC ....... 359/296; 313/504; 345/87, 173; 257/59, 257/72; 430/17, 200, 270; 283/72; 156/219, 156/247

See application file for complete search history.

(56) References Cited

U.S. PATENT DOCUMENTS

| | | | | |
|---|---|---|---|---|
| 3,257,942 | A * | 6/1966 | Ritzerfeld et al. | 101/471 |
| 3,834,925 | A * | 9/1974 | Matsumura et al. | 428/40.8 |
| 4,454,179 | A * | 6/1984 | Bennett et al. | 428/40.8 |
| 5,269,865 | A * | 12/1993 | Kushida et al. | 156/234 |
| 6,228,543 | B1 | 5/2001 | Mizuno et al. | |
| 6,842,278 | B1 * | 1/2005 | Sakamaki et al. | 359/296 |
| 6,939,589 | B2 * | 9/2005 | Chung | 428/32.79 |
| 7,439,196 | B2 * | 10/2008 | Kobayashi et al. | 438/795 |
| 7,513,674 | B1 * | 4/2009 | Donahue | 362/627 |

(Continued)

*Primary Examiner* — Loha Ben
(74) *Attorney, Agent, or Firm* — Gottlieb, Rackman & Reisman (57) ABSTRACT

A transfer print structure is provided. The transfer print structure comprises a substrate; a color ink layer including a functional region; and an adhesive device combining the functional region with the substrate.

18 Claims, 8 Drawing Sheets

(56) References Cited

U.S. PATENT DOCUMENTS

| | | | |
|---|---|---|---|
| 7,579,061 B2 * | 8/2009 | Dronzek, Jr. .................. | 428/42.1 |
| 7,597,968 B2 * | 10/2009 | Kobayashi .................... | 428/690 |
| 7,867,925 B2 * | 1/2011 | Kobayashi et al. ........... | 438/798 |
| 8,283,577 B2 * | 10/2012 | Naito et al. ................... | 174/389 |
| 8,377,630 B2 * | 2/2013 | Fromson et al. .............. | 430/302 |
| 8,714,102 B2 * | 5/2014 | Nakamura .................... | 118/313 |
| 2011/0115212 A1 * | 5/2011 | Hoffmuller et al. ............ | 283/85 |
| 2011/0127762 A1 * | 6/2011 | Hoffmuller et al. ............ | 283/72 |

\* cited by examiner

TRANSFER PRINT STRUCTURE AND THE MANUFACTURING METHOD THEREOF

The application claims the benefit of Taiwan Patent Application No. 099120876, filed on Jun. 25, 2010, in the Taiwan Intellectual Property Office, the disclosures of which are incorporated herein in their entirety by reference.

FIELD OF THE INVENTION

The present invention relates to a transfer print structure and the manufacturing method thereof, and more particularly to a transfer print structure and the manufacturing method thereof for use in the color display device.

BACKGROUND OF THE INVENTION

Recently, the developments of the flat-panel display have matured. Under the promotion of the market, many companies and research units engage in the developments of the display device of the electronic paper. The display device of the electronic paper has the advantages of low power cost, portable convenience, being rolled up and no limitation of the visual angle. The material used for the display device of the electronic paper can be divided into the electrophoretic display material, the electrochromic display material and the twist ball display material. The electrophoresis is formed by charged particles spreading in the suspension solution, and the motion of charged particles can be controlled by applying the electric field to display desired images. Since the particles would influence the reflection of light, the conventional electrophoretic display device only can provide single color display, but not full color display.

New types of electrophoretic display devices provide a color ink layer to solve the problem of not being displayed in full color. According to U.S. Pat. No. 6,228,543 B1, a color photo resist layer can be transferred to an electrophoretic layer through thermal transfer.

Figure 1A:
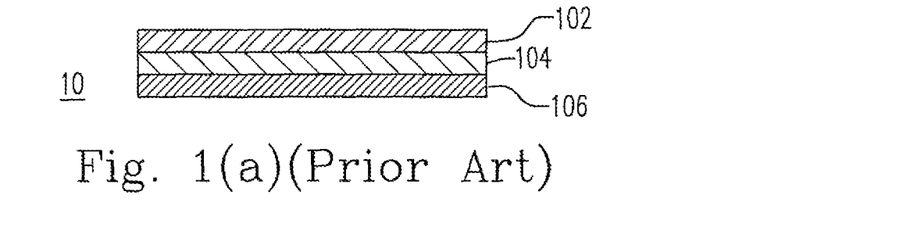
FIG. 1(a) shows the conventional thermal transfer structure.

Please refer to FIG. 1(a), which shows the conventional thermal transfer structure. The conventional thermal transfer structure 10 comprises a donor substrate 102, a light to heat conversion layer 104 and a color ink layer 106.

Figure 1B:
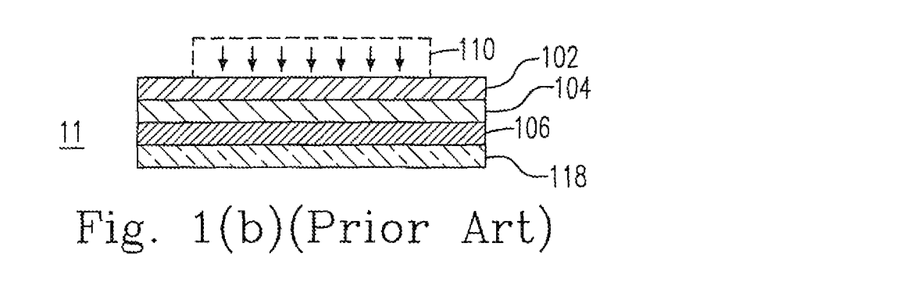
FIG. 1(b) shows that the conventional thermal transfer structure is irradiated.

Please refer to FIG. 1(b), which shows that the conventional thermal transfer structure is irradiated. The irradiated thermal transfer structure 11 comprises a donor substrate 102, a light to heat conversion layer 104, a color ink layer 106 and an acceptor substrate 118. The light to heat conversion layer 104 typically comprises an irradiation absorbent body (not shown), which can absorb irradiation 110, such as laser beams. When the irradiation 110 illuminates at the light to heat conversion layer 104, the light to heat conversion layer 104 absorbs the irradiation 110 and converts a part of the absorbed irradiation 110 into heat to make the color ink layer 106 absorb the heat which is then transferred to the acceptor substrate 118, such as an electrophoretic layer.

Figure 1C:
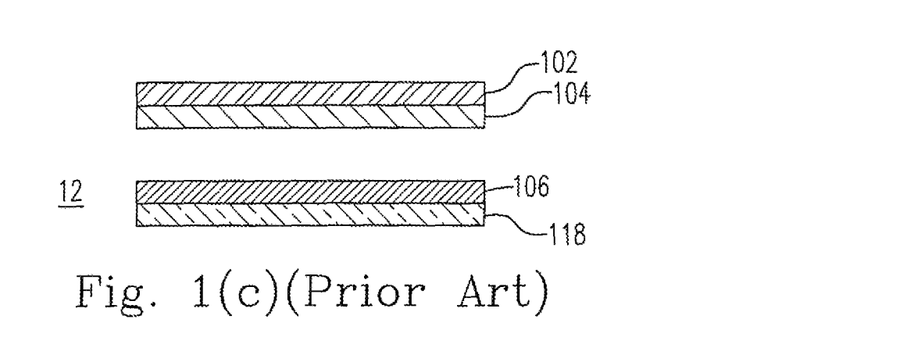
FIG. 1(c) shows the conventional thermal transfer structure after transferred.

Please refer to FIG. 1(c), which shows the conventional thermal transfer structure after transferred. After transferred, the thermal transfer structure 12 comprises a donor substrate 102, a light to heat conversion layer 104, a color ink layer 106 and an acceptor substrate 118. From FIG. 1(c), it is known that the color ink layer 106 has been transferred to the acceptor substrate 118, and the light to heat conversion layer 104 has been separated from the color ink layer 106.

Although the color ink layer 106 would adhere to the acceptor substrate 118 after thermal transfer, it will be easy to peel due to a poor adhesive force.

SUMMARY OF THE INVENTION

In accordance with an aspect of the present invention, a transfer print structure is provided. The transfer print structure comprises a substrate, a color ink layer and an adhesive device. The color ink layer includes a functional region, and an adhesive device combines the functional region with the substrate.

In accordance with another aspect of the present invention, a method for manufacturing a transfer print structure is provided. The method comprises the following steps: (a) adhering a first substrate to a second substrate; (b) providing a color ink layer including a functional region and a nonfunctional region; and (c) adhering the functional region to the second substrate.

In accordance with a further aspect of the present invention, a method for manufacturing a transfer print structure is provided. The method comprises the following steps: (a) providing a first substrate; (b) providing a color ink layer including a functional region; and (c) adhering the functional region to the first substrate.

When there is no adhesive device between the color ink layer and the acceptor substrate, there has formed an adhesive force therebetween. Through the implementation of the present invention, the adhesive force between the color ink layer and the acceptor substrate indeed can be enhanced. The adhesive device can make the functional region of the color ink layer uneasy to peel from the acceptor substrate.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 2:
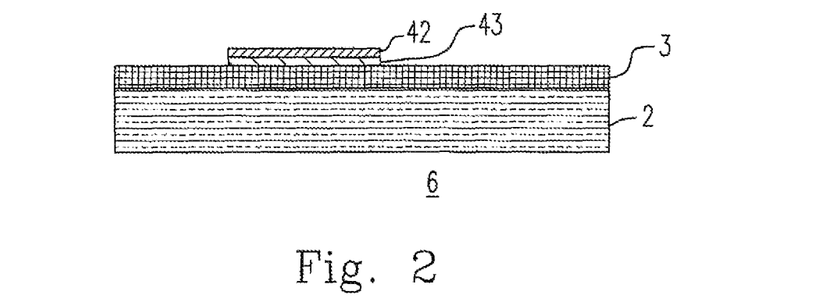
FIG. 2 shows a transfer print structure of the present invention.

Please refer to FIG. 2, which shows a transfer print structure of the present invention. The transfer print structure 6 is preferably used as an electronic paper display device. The transfer print structure 6 comprises a first substrate 2, a second substrate 3, a color ink layer 42 and an adhesive device 43. The second substrate 3 is formed on the first substrate 2, and the color ink layer 42 is preferably a color photo resist layer.

Figure 3:
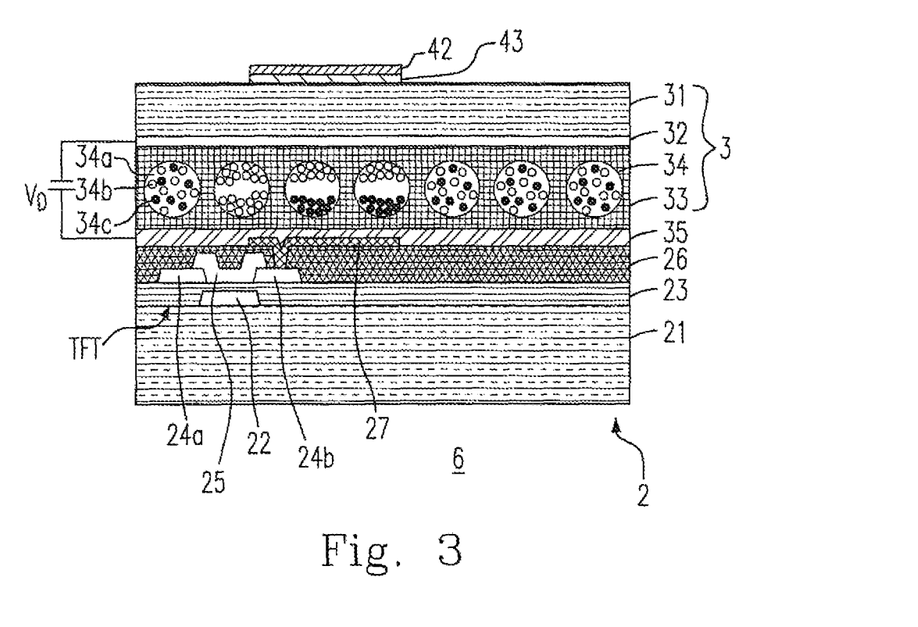
FIG. 3 shows a detailed transfer print structure of the present invention.

Please refer to FIG. 3, which shows a detailed transfer print structure of the present invention. The first substrate 2 comprises a first substrate base 21 and a thin film transistor TFT. The material of the thin film transistor TFT is preferably a silicon semiconductor or an oxide semiconductor, wherein the oxide semiconductor is preferably InGaZnO. The thin film transistor TFT can be a transistor whose gate electrode is located at the bottom thereof, wherein the gate electrode 22 is formed on the first substrate base 21, and the gate electrode 22 can be formed from a metal or a polymer having electric conductivity. A gate electrode insulation layer 23 covers the gate electrode 22, and the gate electrode insulation layer 23 can be formed from organic or inorganic materials. The gate electrode insulation layer 23 can be a single layer or multi-layers. A source 24a and a drain 24b are formed on the gate electrode insulation layer 23, and an active region 25 is formed between the source 24a and the drain 24b and formed on the gate electrode insulation layer 23 to connect the source 24a and the drain 24b. The active region 25 can be formed from elastic organic or inorganic semiconductors. After the thin film transistor TFT is formed, an insulation layer 26 is formed to cover the thin film transistor TFT, and then a pixel electrode 27 is formed on the insulation layer 26. The pixel electrode 27 is coupled to the drain 24b of the thin film transistor TFT.

Then a second substrate 3 is formed, and the second substrate 3 can adhere to the first substrate 2 via an adhesive layer 35. The second substrate 3 comprises a second substrate base 31, a common electrode 32 and an electrophoretic layer 33. The common electrode 32 is formed on the second substrate base 31, and the electrophoretic layer 33 is formed on the common electrode 32. For instance, the electrophoretic layer 33 comprises a plurality of electrophoretic balls 34. In each of the electrophoretic balls 34, there are a plurality of first electrophoretic particles 34b and second electrophoretic particles 34c, the color of the first electrophoretic particles 34b is different from that of the second electrophoretic particles 34c, and all of them are spread in an electrophoretic media 34a. In FIG. 3, when a voltage difference $V_D$ is applied between the pixel electrode 27 and the common electrode 32, the first electrophoretic particles 34b and the second electrophoretic particles 34c are attracted by the common electrode 32 and the pixel electrode 27 respectively to move. This enables the transfer print structure 6 to show a predetermined image.

Figure 4A:
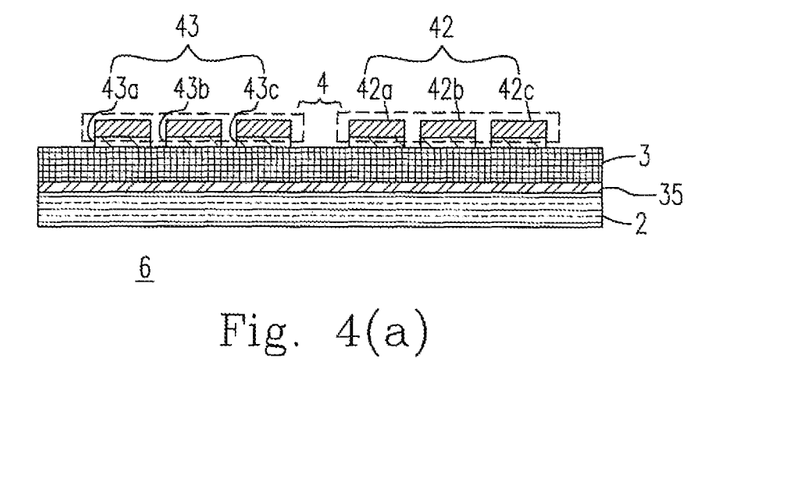
FIG. 4(a) shows a transfer print structure according to a preferred embodiment of the present invention.

Please refer to FIG. 4(a), which shows a transfer print structure 6 according to a preferred embodiment of the present invention. The transfer print structure 6 comprises a second substrate 3, a color ink layer 42 and an adhesive device 43. The color ink layer 42 comprises a red color ink 42a, a green color ink 42b and a blue color ink 42c. The adhesive device 43 comprises a first adhesive substance 43a, a second adhesive substance 43b and a third adhesive substance 43c. The adhesive device 43 preferably has a thickness in a range between 0.8~2.5 μm. In FIG. 3, the color ink layer 42 is aligned with the pixel electrode 27, which enables the color to be sensed. In FIG. 4(a), the color ink layer 42 comprises a functional region 4, and the adhesive device 43 is an adhesive material formed in one piece with the functional region 4 for adhering to the second substrate 3. The material of the adhesive device 43 is an epoxy, a poly-urethane, a cyanamide acrylic or a silicon resin.

Figure 4B:
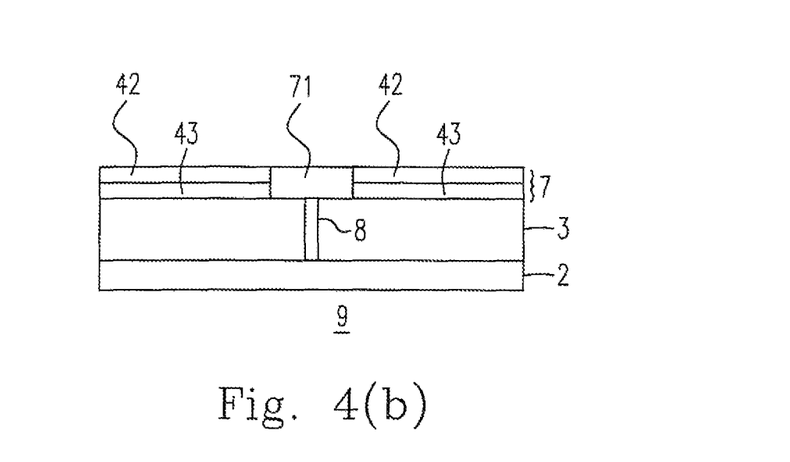
FIG. 4(b) shows another transfer print structure according to a preferred embodiment of the present invention.

Please refer to FIG. 4(b), which shows another transfer print structure 9 according to a preferred embodiment of the present invention. The transfer print structure 9 comprises a color filter 7, a first substrate 2 and a second substrate 3. The color filter 7 comprises a black matrix 71, a color ink layer 42 and an adhesive device 43. The second substrate 3 comprises a spacer 8. In FIG. 4(a), the electrophoretic balls 34 in the second substrate 3 can be replaced by other different materials, such as the cholesteric liquid crystal or the quick response liquid powder. If the electrophoretic balls 34 are manufactured from the above two materials, a supporter is needed to support and separate the color filter 7 from the first substrate 2, such as the spacer 8. In addition, the electrophoretic balls 34 can also be replaced by a micro cup. The black matrix 71 is used for shielding lights from other places of the pixel.

Figure 5A:
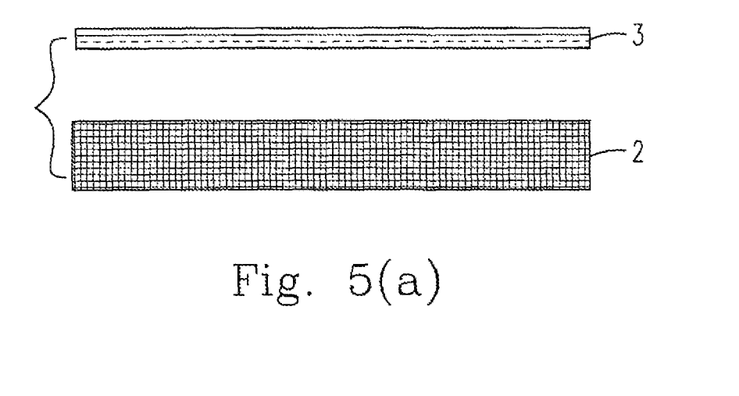
FIGS. 5(a)~5(d) show a method for manufacturing a transfer print structure according to another preferred embodiment of the present invention.

Please refer to FIGS. 5(a)~5(d), which show a method for manufacturing a transfer print structure 6 according to another preferred embodiment of the present invention. In FIG. 5(a), a first substrate 2 is adhered to a second substrate 3; in FIG. 5(c), a color ink layer 53 comprises a functional region 50. From FIG. 3 and FIG. 5(a), it is known that the advantage of adhering the first substrate 2 and the second substrate 3 in advance is to save trouble of aligning the functional region 4 with the pixel electrode 27.

Figure 5B:
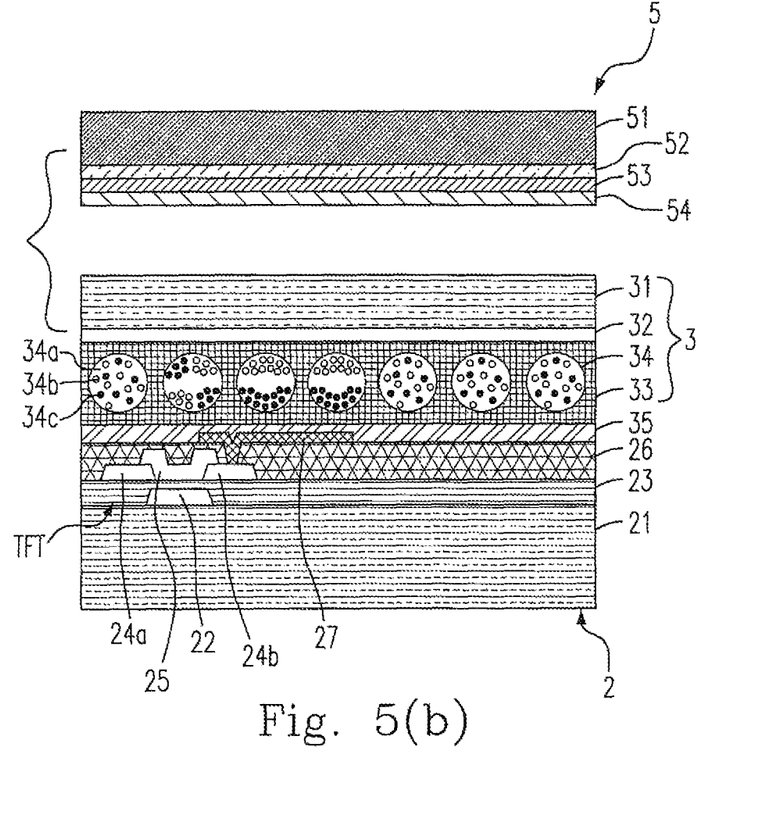

In FIG. 5(b), a donor substrate 5 comprises a donor substrate base 51, a light to heat conversion layer 52, a color ink layer 53 and an adhesive device 54.

Figure 5C:
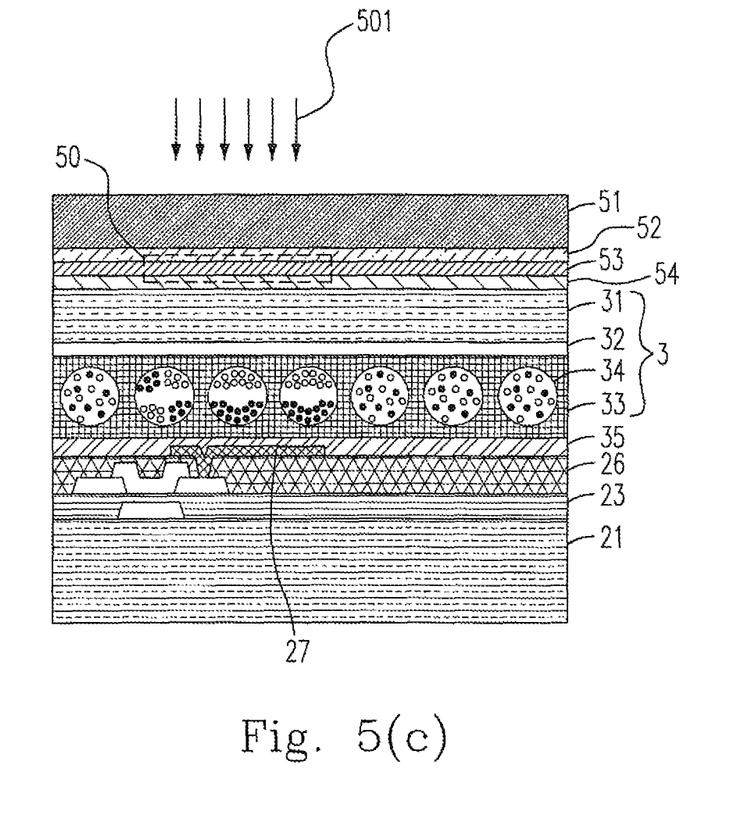

In FIG. 5(c), the donor substrate 5, the second substrate 3 and the first substrate 2 are stacked up. Then an irradiation 501 illuminates a functional region 50, which is aligned with the pixel electrode 27, and the irradiation 501 is preferably a laser beam. The laser beam can accurately illuminate the functional region 50, and the light to heat conversion layer 52 above the functional region 50 can absorb a part of the laser beam and then convert it into heat. The functional region 50 of the color ink layer 53 and the adhesive device 54 near the function region 50 absorb the heat, and are melted to adhere to the second substrate 3, since the respective melting points of the color ink layer 53 and the adhesive device 54 are lower than that of the light to heat conversion layer 52. In other words, the color ink layer 53 and the adhesive device 54 are transfer-printed onto the second substrate 3. Through the above-mentioned manner, other functional regions (not shown) can also be adhered to the second substrate 3.

Figure 5D:
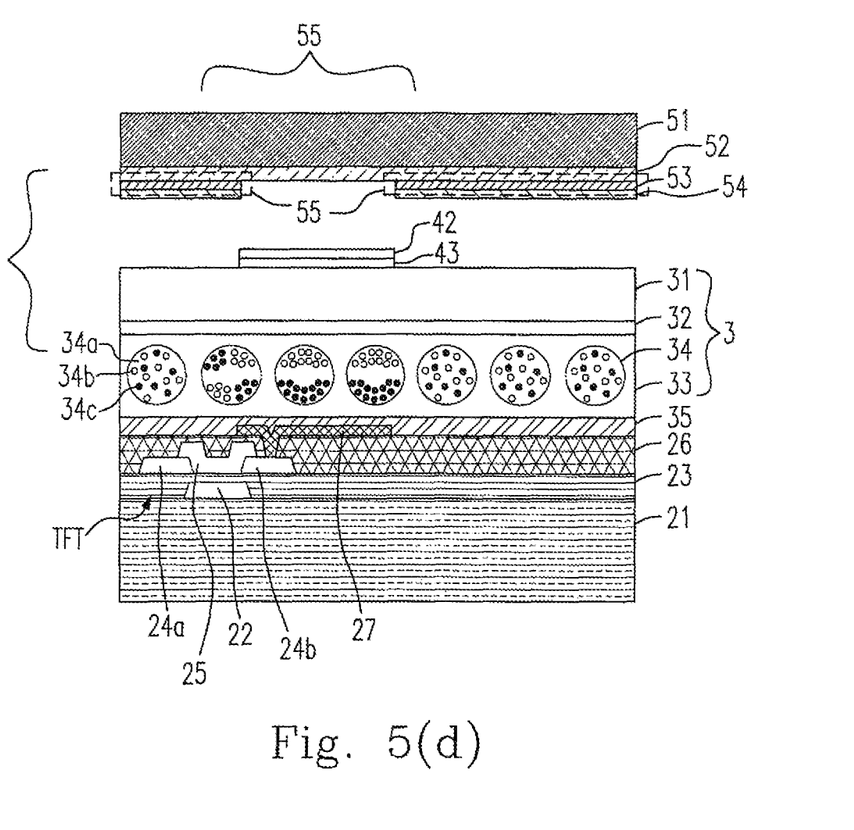

In FIG. 5(d), after the functional region 50 and the adhesive device 54 therenear adhere to the second substrate 3, a color ink layer 42 and an adhesive device 43 are formed on the second substrate 3 respectively, and then the donor substrate 5 is removed. The color ink layer 53 comprises a nonfunctional region 55. When the donor substrate 5 is removed, the nonfunctional region 55 and the adhesive device 54 therenear would be separated from the second substrate 3, and the color ink layer 42 and the adhesive device 43 near the functional region 50 would remain on a second substrate base 31. There has formed an adhesive force between the color ink layer 42 and the second substrate 3 before the adhesive device 43 is disposed therebetween, and the adhesive device 43 can enhance the adhesive force between the color ink layer 42 and the second substrate 3 to prevent the color ink layer 42 from peeling. After the donor substrate 5 is removed, a protecting film (not shown) is adhered onto the color ink layer 42 to prevent it from pollution.

From another preferred embodiment of the present invention, it is known that the method for manufacturing the transfer print structure 6 comprises the following steps: (a) adhering the first substrate 2 to the second substrate 3; (b) providing a color ink layer 53 including a functional region 50 and a nonfunctional region 55; and (c) adhering the functional region 50 to the second substrate 3.

Figure 6A:
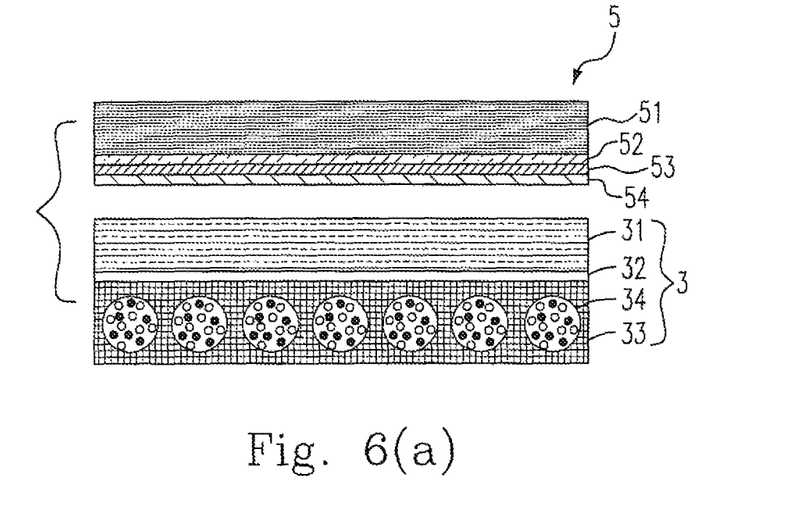
FIGS. 6(a)~6(d) show a method for manufacturing a transfer print structure according to a further preferred embodiment of the present invention.

Please refer to FIGS. 6(a)~6(d), which show a method for manufacturing a transfer print structure 6 according to a further preferred embodiment of the present invention. In FIG. 6(a), a donor substrate 5 is provided first, and comprises a donor substrate base 51, a light to heat conversion layer 52, a color ink layer 53 and an adhesive device 54. Then the color ink layer 53 and the adhesive device 54 are toward a second substrate base 31 to be stacked up thereon.

Figure 6B:
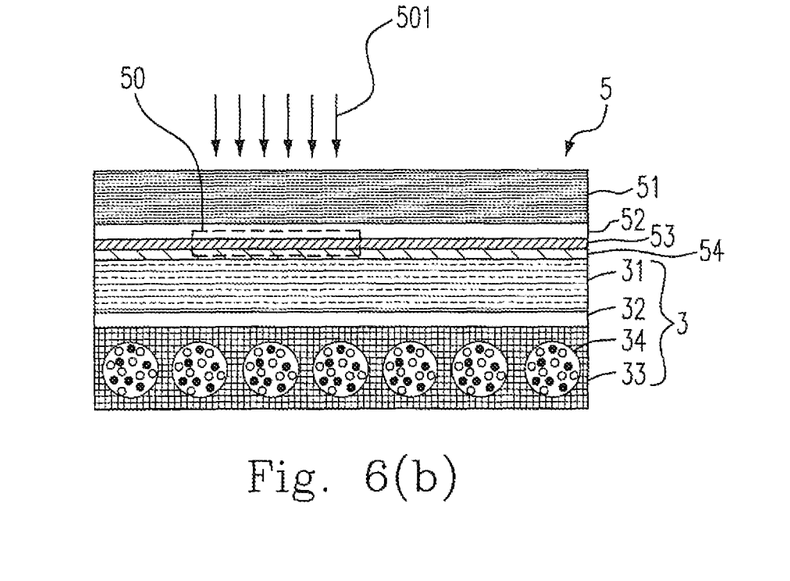

In FIG. 6(b), an irradiation 501 illuminates a functional region 50 whose location is related to that of a pixel electrode 27, and the irradiation 501 is preferably a laser beam. The laser beam can accurately illuminate a functional region 50, and the light to heat conversion layer 52 above the functional region 50 can absorb a part of laser beam and then convert it into heat. The functional region 50 and the adhesive device 54 therenear absorb the heat, and are melted to adhere to the second substrate 3, since the respective melting points of the color ink layer 53 and the adhesive device 54 are lower than that of the light to heat conversion layer 52. In other words, the color ink layer 53 and the adhesive device 54 are transfer-printed onto the second substrate 3. Through the above-mentioned manner, other functional regions (not shown) can also be adhered to the second substrate 3.

Figure 6C:
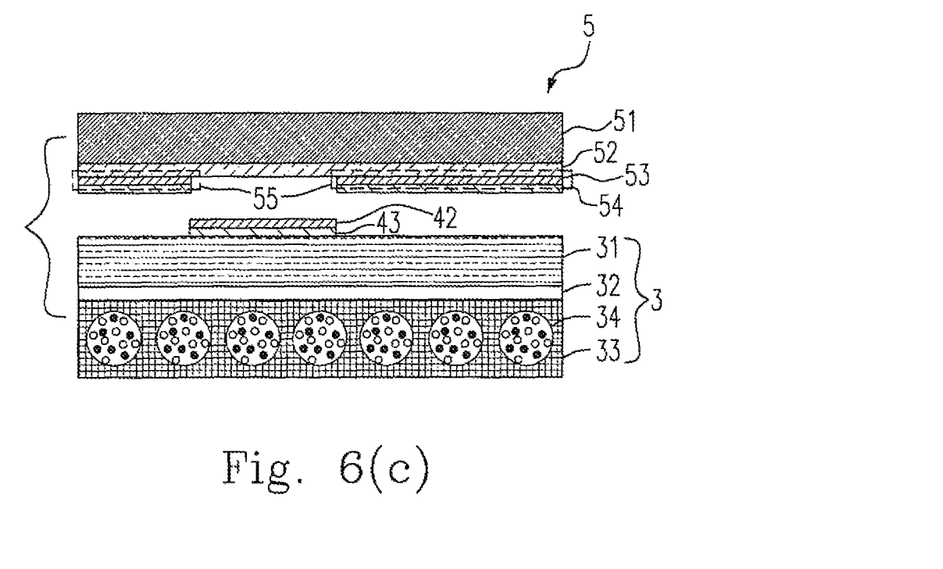

In FIG. 6(c), after the functional region 50 and the adhesive device 54 therenear adhere to the second substrate 3, a color ink layer 42 and an adhesive device 43 are formed on the second substrate 3 respectively, and then the donor substrate 5 is removed. The color ink layer 53 comprises a nonfunctional region 55. When the donor substrate 5 is removed, the nonfunctional region 55 and the adhesive device 54 therenear would be separated from the second substrate 3, and the color ink layer 42 and the adhesive device 43 near the functional region 50 would remain on the second substrate base 31. There has formed an adhesive force between the color ink layer 42 and the second substrate 3 before the adhesive device 43 is disposed therebetween, and the adhesive device 43 can enhance the adhesive force between the color ink layer 42 and the second substrate 3 to prevent the color ink layer 42 from peeling.

Figure 6D:
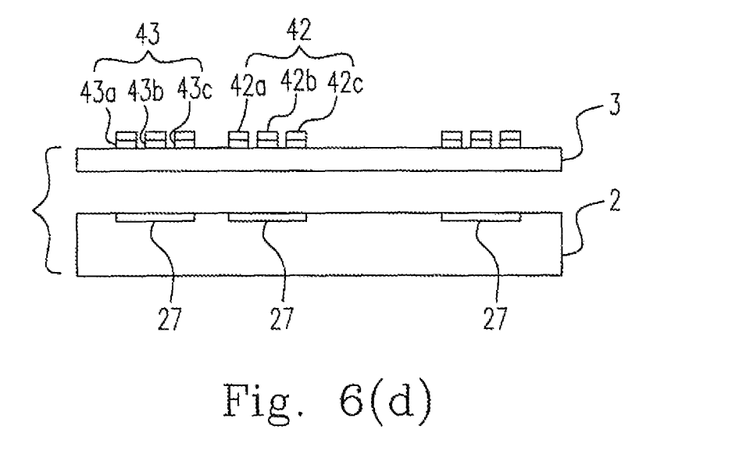

In FIG. 6(d), the color ink layer 42 and the adhesive device 43 have been adhered onto the second substrate 3, and then the second substrate 3 is adhered to the first substrate 2. In the process of adhesion, it should be noticed that the color ink layer 42 has to be aligned with the pixel electrode 27. However, in FIGS. 5(a)~5(d), since the first substrate 2 and the second substrate 3 are adhered in advance, in the process of irradiation, as long as the functional region 50 is selectively illuminated, the color ink layer 42 can be transfer-printed onto the region of the pixel electrode 27, and there is no need to align the color ink layer 42 with the pixel electrode 27.

From a further preferred embodiment of the present invention, it is known that the method for manufacturing the transfer print structure 6 comprises the following steps: (a) providing the second substrate 3; (b) providing the color ink layer 53 including a functional region 50; and (c) adhering the functional region 50 to the second substrate 3.

In accordance with a first embodiment of the present invention, a transfer print structure is provided. The transfer print structure comprises a substrate; a color ink layer including a functional region; and an adhesive device combining the functional region with the substrate.

Preferably, the adhesive device is an adhesive layer disposed between the functional region and the substrate, and is an adhesive material formed in one piece with the functional region to adhere to the substrate.

Preferably, the adhesive device comprises a material being one selected from a group consisting of an epoxy, a polyurethane, a cyanamide acrylic and a silicon resin.

Preferably, the color ink layer further comprises a nonfunctional region.

Preferably, the color ink layer is a color photo resist layer.

Preferably, the transfer print structure further comprises a heat conversion layer, wherein the color ink layer is disposed between the heat conversion layer and the adhesive device.

Preferably, the adhesive device has a thickness in a range between 0.8~2.5 µm.

Preferably, the substrate comprises a plurality of electrophoretic balls and a thin film transistor.

Preferably, the thin film transistor comprises a material being one of a silicon semiconductor and an oxide semiconductor.

Preferably, the oxide semiconductor is InGaZnO.

Preferably, the functional region is selectively irradiated to make the functional region be transfer-printed onto the substrate.

Preferably, the transfer print structure further has an adhesive force formed between the functional region and the substrate, and the adhesive force is enhanced by the adhesive device.

Preferably, the transfer print structure further comprises a color filter, a black matrix and a spacer.

In accordance with a second embodiment of the present invention, a method for manufacturing a transfer print structure is provided. The method comprises steps of (a) adhering a first substrate to a second substrate; (b) providing a color ink layer including a functional region and a nonfunctional region; and (c) adhering the functional region to the second substrate.

Preferably, the method further comprises following steps after the step (c): (d) separating the nonfunctional region from the second substrate; and (e) adhering a protecting film to the functional region.

Preferably, the method further comprises a step of selectively irradiating the functional region to make the functional region be transfer-printed onto the second substrate.

Preferably, the transfer print structure has an adhesive force formed between the functional region and the second substrate, and the adhesive force is enhanced by the step (c).

Preferably, the transfer print structure further comprises a heat conversion layer, the color ink layer is a color photo resist layer and disposed between the heat conversion layer and the second substrate, the second substrate comprises a plurality of electrophoretic balls, and the first substrate comprises a thin film transistor.

In accordance with a third embodiment of the present invention, a method for manufacturing a transfer print structure is provided. The method comprises steps of (a) providing a first substrate; (b) providing a color ink layer including a functional region; and (c) adhering the functional region to the first substrate.

Preferably, the method further comprises steps of (d) providing a second substrate including a pixel electrode; and (e) adhering the first substrate to the second substrate by aligning the pixel electrode with the functional region.

Based on the above, the present invention effectively solves the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A transfer print structure, comprising:
   a substrate;
   a heat conversion layer;
   a color ink layer including a functional region; and
   an adhesive device combining the functional region with the substrate,
   wherein the color ink layer is disposed between the heat conversion layer and the adhesive device.

2. A transfer print structure as claimed in claim 1, wherein the adhesive device is an adhesive layer disposed between the functional region and the substrate, and is an adhesive material formed in one piece with the functional region to adhere to the substrate.

3. A transfer print structure as claimed in claim 1, wherein the adhesive device comprises a material being one selected from a group consisting of an epoxy, a polyurethane, a cyanamide acrylic and a silicon resin.

4. A transfer print structure as claimed in claim 1, wherein the color ink layer further comprises a nonfunctional region.

5. A transfer print structure as claimed in claim 1, wherein the color ink layer is a color photo resist layer.

6. A transfer print structure as claimed in claim 1, wherein the adhesive device has a thickness in a range between 0.8~2.5 μm.

7. A transfer print structure as claimed in claim 1, wherein the substrate comprises a plurality of electrophoretic balls and a thin film transistor.

8. A transfer print structure as claimed in claim 7, wherein the thin film transistor comprises a material being one of a silicon semiconductor and an oxide semiconductor.

9. A transfer print structure as claimed in claim 8, wherein the oxide semiconductor is InGaZnO.

10. A transfer print structure as claimed in claim 1, wherein the functional region is selectively irradiated to make the functional region be transfer-printed onto the substrate.

11. A transfer print structure as claimed in claim 1, further having an adhesive force formed between the functional region and the substrate, and the adhesive force is enhanced by the adhesive device.

12. A transfer print structure as claimed in claim 1, further comprising a color filter including a black matrix, the color ink layer and the adhesive device.

13. A method for manufacturing a transfer print structure, comprising steps of:
    (a) adhering a first substrate to a second substrate;
    (b) providing a color ink layer including a functional region and a nonfunctional region; and
    (c) adhering the functional region to the second substrate.

14. A method as claimed in claim 13, further comprising following steps after the step (c):
    (d) separating the nonfunctional region from the second substrate; and
    (e) adhering a protecting film to the functional region.

15. A method as claimed in claim 13, further comprising a step of selectively irradiating the functional region to make the functional region be transfer-printed onto the second substrate.

16. A method as claimed in claim 13, wherein the transfer print structure has an adhesive force formed between the functional region and the second substrate, and the adhesive force is enhanced by the step (c).

17. A method as claimed in claim 13, wherein the transfer print structure further comprises a heat conversion layer, the color ink layer is a color photo resist layer and disposed between the heat conversion layer and the second substrate, the second substrate comprises a plurality of electrophoretic balls, and the first substrate comprises a thin film transistor.

18. A method for manufacturing a transfer print structure, comprising steps of:
    (a) providing a first substrate;
    (b) providing a color ink layer including a functional region;
    (c) adhering the functional region to the first substrate;
    (d) providing a second substrate including a pixel electrode; and
    (e) adhering the first substrate to the second substrate by aligning the pixel electrode with the functional region.

* * * * *